US010986350B2

(12) United States Patent
Andrivon et al.

(10) Patent No.: US 10,986,350 B2
(45) Date of Patent: Apr. 20, 2021

(54) METHOD AND APPARATUS FOR CODING A VIDEO INTO A BITSTREAM CARRYING REGION-BASED POST PROCESSING PARAMETERS INTO AN SEI NESTING MESSAGE

(71) Applicant: INTERDIGITAL VC HOLDINGS, INC., Wilmington, DE (US)

(72) Inventors: Pierre Andrivon, Liffre (FR); Philippe Bordes, Laille (FR); Edouard Francois, Bourg des Comptes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/090,263

(22) PCT Filed: Mar. 14, 2017

(86) PCT No.: PCT/EP2017/056019
§ 371 (c)(1),
(2) Date: Sep. 30, 2018

(87) PCT Pub. No.: WO2017/167576
PCT Pub. Date: Oct. 5, 2017

(65) Prior Publication Data
US 2019/0116366 A1 Apr. 18, 2019

(30) Foreign Application Priority Data
Mar. 31, 2016 (EP) ........................................ 1630538

(51) Int. Cl.
*H04N 19/176* (2014.01)
*H04N 19/70* (2014.01)
(Continued)

(52) U.S. Cl.
CPC ......... *H04N 19/176* (2014.11); *H04N 19/124* (2014.11); *H04N 19/167* (2014.11);
(Continued)

(58) Field of Classification Search
CPC .. H04N 19/176; H04N 19/124; H04N 19/167; H04N 19/517; H04N 19/70
See application file for complete search history.

(56) References Cited

U.S. PATENT DOCUMENTS 8,184,153 B2    5/2012  Kang et al.
8,878,928 B2 *  11/2014 Kang .................. H04N 21/235
                                                348/135
(Continued)

FOREIGN PATENT DOCUMENTS

CN     101313578 A    11/2008
CN     104885456 A     9/2015
(Continued)

OTHER PUBLICATIONS

De Schrijver et al., "Exploitation of Interactive Region of Interest Scalability in Scalable Video Coding by Using an XML-driven Adaptation Framework", 2nd International Conference on Automated Production of Cross Media Content for Multi-channel Distribution, Leeds, United Kingdom, Dec. 13, 2006, 9 pages.
(Continued)

*Primary Examiner* — Jamie J Atala
*Assistant Examiner* — Hesham K Abouzahra
(74) *Attorney, Agent, or Firm* — Invention Mine LLC

(57) ABSTRACT

A method and an apparatus for encoding a video into a bitstream carrying windows processing coordinates for locally post-processing a video is presented. Such a method comprises:—encoding at least one picture of said video into a bitstream (301),—encoding (302) at least one Supplemental Enhancement Information nesting message, wherein
(Continued)

encoding said at least one Supplemental Enhancement Information nesting message comprises:—encoding (303) at least one set of parameters representative of a location of a region in said picture,—encoding (304) at least one Supplemental Enhancement Information message, wherein said at least one Supplemental Enhancement Information message encodes processing information for processing pixels comprised in said region of said picture.

20 Claims, 4 Drawing Sheets

(51) Int. Cl.
*H04N 19/124* (2014.01)
*H04N 19/167* (2014.01)
*H04N 19/517* (2014.01)
*H04N 19/85* (2014.01)
*H04N 19/80* (2014.01)

(52) U.S. Cl.
CPC .......... *H04N 19/517* (2014.11); *H04N 19/70* (2014.11); *H04N 19/80* (2014.11); *H04N 19/85* (2014.11)

(56) References Cited

U.S. PATENT DOCUMENTS

| | | | |
|---|---|---|---|
| 8,948,241 B2 | 2/2015 | Chen et al. | |
| 9,554,133 B2 | 1/2017 | Ye et al. | |
| 2013/0235152 A1* | 9/2013 | Hannuksela | H04N 19/114 348/43 |
| 2014/0092976 A1 | 4/2014 | Deshpande | |
| 2015/0016504 A1 | 1/2015 | Auyeung et al. | |
| 2015/0103926 A1 | 4/2015 | Hannuksela | |
| 2015/0103927 A1* | 4/2015 | Hannuksela | H04N 19/597 375/240.26 |
| 2015/0350659 A1 | 12/2015 | Auyeung et al. | |

FOREIGN PATENT DOCUMENTS

| | | |
|---|---|---|
| KR | 20150140360 | 12/2015 |
| RU | 2012108618 A | 11/2013 |
| WO | WO 2013030458 | 3/2013 |
| WO | 2013153830 A1 | 10/2013 |
| WO | WO 2014168650 | 10/2014 |
| WO | WO 2015014773 | 2/2015 |
| WO | WO 2015056182 | 4/2015 |

OTHER PUBLICATIONS

Ramasubramonian et al., "HEVC corrigendum: On parsing of bitstream partition nesting SEI message", Joint Collaborative Team on Video Coding (JVT-VC) of ITU-T SG16 WP 3 and ISO/IEC JTC 1/SC 29/WG 11, Document JCTVC-V0062, 22nd Meeting, Geneva, Switzerland, Oct. 15, 2015, pp. 1-3.

Anonymous, "Series H: Audiovisual and Multimedia Systems, Infrastructure of Audiovisual Services—Coding of Moving Video", Recommendation ITU T H.265 Standard, Telecommunication Standardization Sector of ITU, Apr. 2015, pp. 1-634.

Hannuksela et al., "Scope of Supplemental Enhancement Information Messages", Joint Video Team (JVT) of ISO/IEC MPEG & ITU-T VCEG (ISO/IEC JTC1/SC29/WG11 and ITU-T SG16 Q.6), Document JVT-T073, 20th Meeting, Klagenfurt, Austria, Jul. 2006, pp. 1-6.

Karczewicz et al., "Post-Filter SEI Message Extensions", ITU—Telecommunications Standardizations Sector, Study Group 16, Question 6, Video Coding Experts Group (VCEG), Document VCEG-AI34, 35th Meeting, Berlin, Germany, Jul. 16, 2008, pp. 1-3.

Anonymous, "WD Standard—Dynamic Metadata for Color Volume Transformation—Core Components", Society of Motion Picture and Television Engineers, SMPTE ST 2094-1:201x, Version 18, Oct. 7, 2015, 15 pages.

* cited by examiner

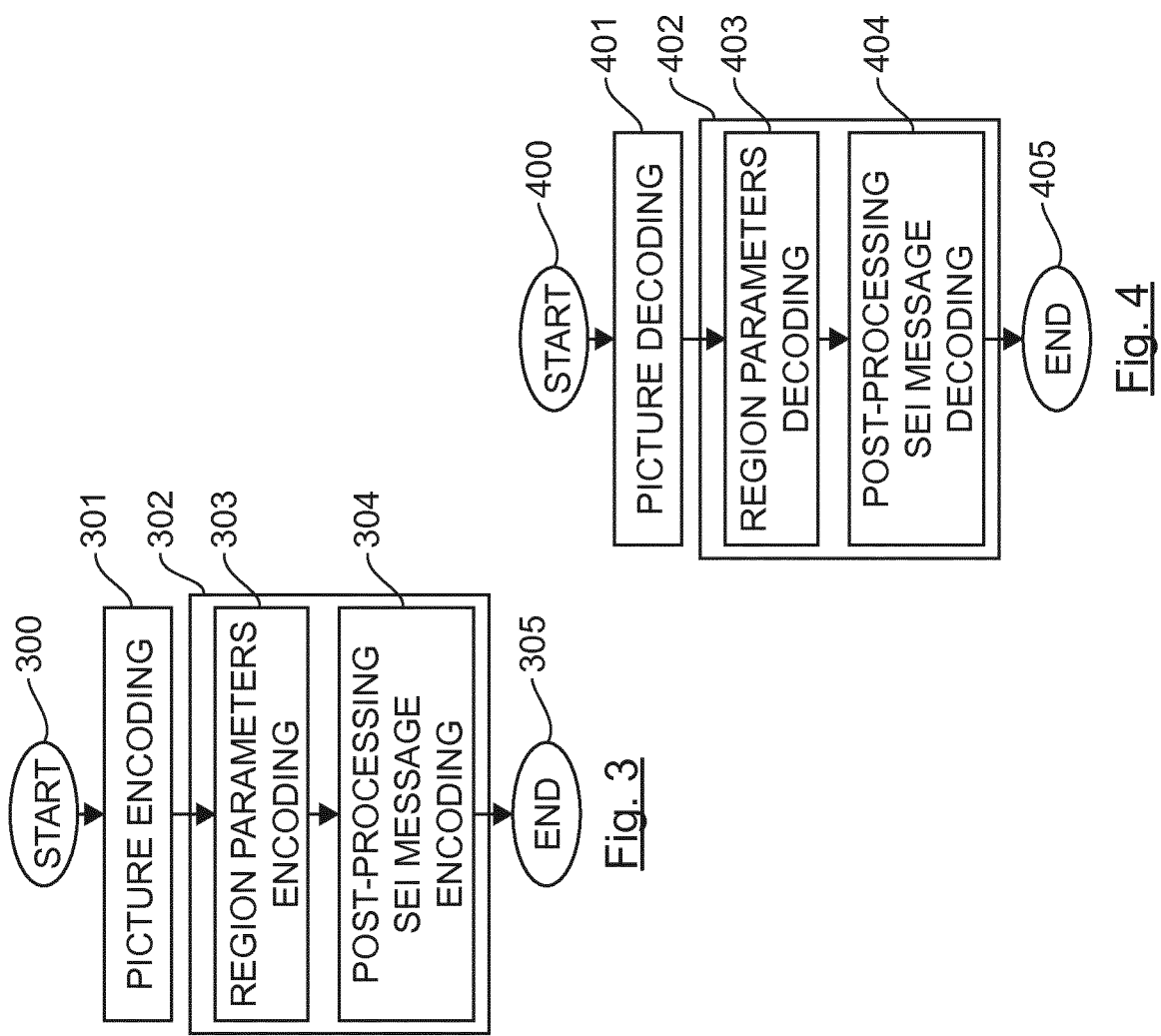
Fig. 4
Fig. 3
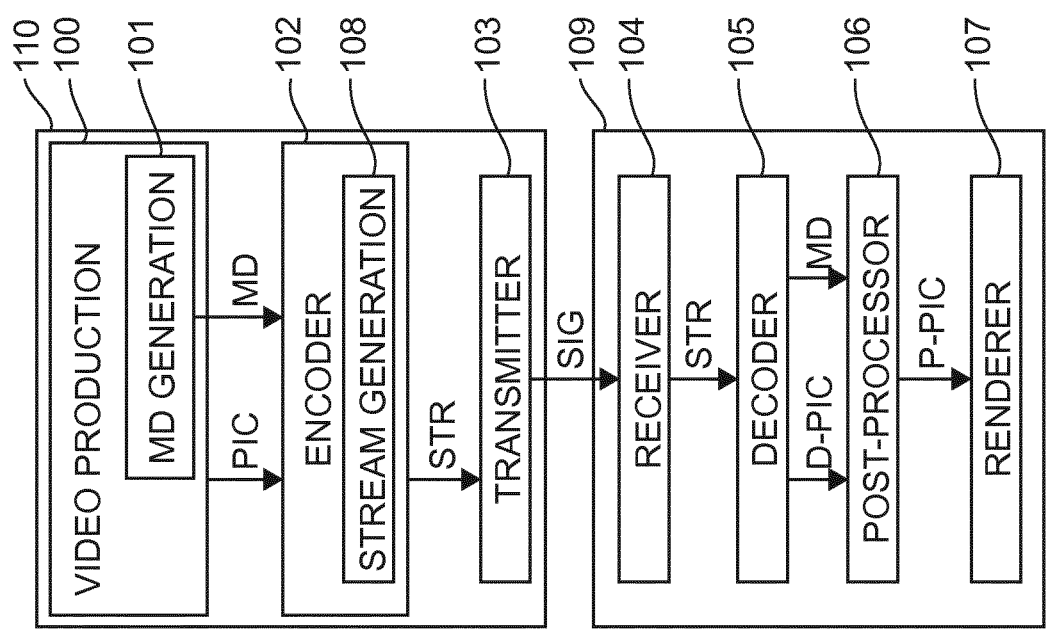
Fig. 1

METHOD AND APPARATUS FOR CODING A VIDEO INTO A BITSTREAM CARRYING REGION-BASED POST PROCESSING PARAMETERS INTO AN SEI NESTING MESSAGE

This application claims the benefit, under 35 U.S.C. § 365 of International Application PCT/EP2017/056019, filed Mar. 14, 2017, which was published in accordance with PCT Article 21(2) on Oct. 5, 2017, in English, and which claims the benefit of European Patent Application No. 16305383.8, filed Mar. 31, 2016.

1. TECHNICAL FIELD

A method and an apparatus for coding a video into a bitstream are disclosed. Corresponding decoding method and apparatus are further disclosed.

2. BACKGROUND ART

Metadata are generated during the content production stage of a video or just prior to the encoding stage of a video. Such metadata are transmitted all along the video value chain in order to feed post-decoding processes, typically in receivers such as television (TV) or Set-Top-Box (STB). For example, such metadata may comprise parameters to be applied by a receiver or a renderer to reconstructed pictures of a video in order to improve image quality, or perception of the video for a user, or to adapt the video rendering according to the receivers' capabilities.

SMPTE standards defines such metadata, e.g. SMPTE ST 2086 for static metadata, SMPTE ST 2094 for content-dependent or dynamic metadata for use in production environment. More particularly, ST 2094 standard defines metadata that are applicable per processing windows or region-of-interest (ROI).

Such metada may need to be carried along with coded bitstreams of the video sequence during the video distribution stage in order to be used by post-decoding process performed for instance in external convertors or renderers.

Supplemental Enhancement Information (SEI) messages have been specified in H.26x standards. Such messages allow carrying metadata along the coded bitstream of a video sequence.

For example, some SEI messages may carry post-processing parameters for Colour Remapping, or post filtering, etc.

However, such SEI messages carry post-processing parameters to be applied on a whole reconstructed picture, i.e. on all the pixels of the picture.

There is no signaling or mechanism enabling windows/ROI processing as defined in ST 2094.

One solution would be to convey via another mean processing window coordinates associated with each processing SEI message. However, this multiplies the number of metadata carriers and increase the risk to loose or to handle badly metadata (wrong combination/ordering or wrong association of processing windows with processing metadata).

There is thus a need for an encoding/decoding method adapted to apply processing SEI messages locally on an image.

3. SUMMARY

According to an aspect of the present principle, a method for encoding a video is disclosed, the method comprising:

encoding at least one picture of said video into a bitstream,
encoding at least one Supplemental Enhancement Information nesting message, wherein encoding said at least one Supplemental Enhancement Information nesting message comprises:
  encoding at least one set of parameters representative of a location of a region in said picture,
  encoding at least one Supplemental Enhancement Information message, wherein said at least one Supplemental Enhancement Information message encodes processing information, e.g. metadata, for processing pixels comprised in said region of said picture.

The present disclosure allows carrying along a coded bitstream of a video sequence with region-based information for post-processing a picture of the video. Existing SEI messages of H.26x standard that carry post-processing information can thus be re-used. Therefore, it is not needed to redefine post-processing SEI messages. Advantageously, the present disclosure provides a new functionality to existing post-processing SEI messages by adding window processing to such SEI messages. Window processing parameters are consistently associated within the same information carriage mechanism.

An apparatus for encoding a video is disclosed that comprises:
means for encoding at least one picture of said video into a bitstream,
means for encoding at least one Supplemental Enhancement Information nesting message, wherein said means for encoding said at least one Supplemental Enhancement Information nesting message comprises:
  means for encoding at least one parameter representative of a location of a region in said picture,
  means for encoding at least one Supplemental Enhancement Information message, wherein said at least one Supplemental Enhancement Information message encodes processing information for processing pixels comprised in said region of said picture.

In a variant, an apparatus for encoding a video is disclosed that comprises a communication interface configured to access at least one picture of the video and at least one processor configured to:
encode the at least one accessed picture into a bitstream,
encode at least one Supplemental Enhancement Information nesting message, wherein to encode said at least one Supplemental Enhancement Information nesting message comprises:
  to encode at least one parameter representative of a location of a region in said picture,
  to encode at least one Supplemental Enhancement Information message, wherein said at least one Supplemental Enhancement Information message encodes processing information for processing pixels comprised in said region of said picture.

According to one embodiment, encoding at least one Supplemental Enhancement Information nesting message comprises further encoding a parameter indicating a number of regions in said picture to which said at least one Supplemental Enhancement Information message applies. Such an embodiment makes it possible to define several regions or processing windows of the picture to which the SEI message comprised in the SEI nesting message should be applied. Therefore, the bandwith use is optimized.

According to another embodiment of the present principle, encoding at least one Supplemental Enhancement Information nesting message comprises further encoding a parameter indicating a number of Supplemental Enhancement Information messages. Such an embodiment makes it possible to encompass several post-processing SEI messages into one SEI nesting message defined for one or more regions of a picture. Therefore, it reduces the need for conveying several SEI messages with an identical intent or with the same payload type and it further provides an implicit ordering for post-processing operations in case several processing windows overlap.

According to an aspect of the present principle, a method for decoding a bitstream representative of a coded video is disclosed, the method for decoding comprising:

decoding at least one picture of said video from said bitstream, delivering a decoded picture, decoding at least one Supplemental Enhancement Information nesting message, wherein decoding said at least one Supplemental Enhancement Information nesting message comprises:

decoding at least one set of parameters representative of a location of a region in said decoded picture, decoding at least one Supplemental Enhancement Information message, wherein said at least one Supplemental Enhancement Information message comprises processing information for processing pixels comprised in said region of said decoded picture.

An apparatus for decoding a bitstream representative of a coded video is disclosed that comprises:

means for decoding at least one picture of said video from said bitstream to obtain a decoded picture, means for decoding at least one Supplemental Enhancement Information nesting message, wherein said means for decoding said at least one Supplemental Enhancement Information nesting message comprises:

means for decoding at least one parameter representative of a location of a region in said decoded picture, means for decoding at least one Supplemental Enhancement Information message, wherein said at least one Supplemental Enhancement Information message comprises processing information for processing pixels comprised in said region of said decoded picture.

In a variant, a decoding apparatus is disclosed that comprises a communication interface configured to access at least a stream and at least one processor configured to:

decode at least one picture of said video from said accessed bitstream to obtain a decoded picture, decode at least one Supplemental Enhancement Information nesting message, wherein to decode said at least one Supplemental Enhancement Information nesting message comprises:

to decode at least one parameter representative of a location of a region in said decoded picture, to decode at least one Supplemental Enhancement Information message, wherein said at least one Supplemental Enhancement Information message comprises processing information for processing pixels comprised in said region of said decoded picture.

According to one embodiment, decoding at least one Supplemental Enhancement Information nesting message comprises further decoding a parameter indicating a number of regions in said picture to which said at least one Supplemental Enhancement Information message applies.

According to another embodiment of the present principles, decoding at least one Supplemental Enhancement Information nesting message comprises further decoding a parameter indicating a number of Supplemental Enhancement Information messages.

The present embodiment also provides a computer readable storage medium having stored thereon instructions for coding a video according to any one of the embodiments described in the disclosure.

The present embodiment also provides a computer readable storage medium having stored thereon instructions for decoding a video according to any one of the embodiments described in the disclosure.

A bitstream representative of a coded video is also disclosed that comprises:

coded data representative of one picture of said video, at least one Supplemental Enhancement Information nesting message, wherein said at least one Supplemental Enhancement Information nesting message comprises:

at least one parameter representative of a location of a region in said picture, at least one Supplemental Enhancement Information message, wherein said at least one Supplemental Enhancement Information message encodes processing information for processing pixels comprised in said region of said picture.

A non-transitory processor readable medium having stored thereon a bitstream is disclosed wherein the bitstream comprises:

coded data representative of one picture of said video, at least one Supplemental Enhancement Information nesting message, wherein said at least one Supplemental Enhancement Information nesting message comprises:

at least one parameter representative of a location of a region in said picture, at least one Supplemental Enhancement Information message, wherein said at least one Supplemental Enhancement Information message encodes processing information for processing pixels comprised in said region of said picture.

According to one implementation, the different steps of the method for coding a video or decoding a video as described here above are implemented by one or more software programs or software module programs comprising software instructions intended for execution by a data processor of an apparatus for coding/decoding a video, these software instructions being designed to command the execution of the different steps of the methods according to the present principles.

A computer program is also disclosed that is capable of being executed by a computer or by a data processor, this program comprising instructions to command the execution of the steps of a method for coding a video or of the steps of a method for decoding a video as mentioned here above.

This program can use any programming language whatsoever and be in the form of source code, object code or intermediate code between source code and object code, such as in a partially compiled form or any other desirable form whatsoever.

The information carrier can be any entity or apparatus whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the present principles can be especially uploaded to an Internet type network.

As an alternative, the information carrier can be an integrated circuit into which the program is incorporated, the circuit being adapted to executing or to being used in the execution of the methods in question.

According to one embodiment, the methods/apparatus may be implemented by means of software and/or hardware components. In this respect, the term "module" or "unit" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

4. BRIEF DESCRIPTION OF THE DRAWINGS

FIG. 1 illustrates an exemplary system for encoding and decoding a bitstream representative of a video and carrying region-based post processing parameters into an SEI nesting message, according to an embodiment of the present principle.

FIG. 2A illustrates a block diagram for an exemplary coder for coding a picture from a video into coded video data, FIG. 2B illustrates an exemplary access unit for a coded picture according to the NAL unit principle, FIG. 2C illustrates a block diagram for an exemplary decoder for decoding a picture from a video from coded video data, FIG. 3 illustrates a block diagram of an exemplary method for encoding a video according to an embodiment.

FIG. 4 illustrates a block diagram of an exemplary method for decoding a video according to an embodiment.

5. DESCRIPTION OF EMBODIMENTS

FIG. 1 illustrates an exemplary system for coding (110) a video into a bitstream carrying region-based post processing parameters into an SEI nesting message and an exemplary system for decoding (109) said corresponding bitstream, according to an embodiment of the present principle.

FIG. 1 comprises a video production module 100 adapted to produce a video content. The video production module may be a production platform comprising for instance a camera for capturing live video content and an interface for enabling a producer or a colorist to operate on the captured live content and generate information, e.g. metadata, associated to the video content. Such information makes it possible to improve image quality or better represent artistic intent of the Creatives, for instance by color grading the pictures of the video.

For instance, it may be necessary to adapt the rendering quality of a transmitted video according to the capabilities of a receiver. For example, HDR (High Dynamic Range) picture may not be supported by SDR (Standard Dynamic Range) display, or by SDR interfaces such as HDMI (High Definition Multimedia Interface). In this case, the renderer or an equipment upstream to the renderer (e.g. a STB, a Blu-ray player) may process the picture of a received video to adapt the pictures to the display characteristics or to the display supported formats. In order to preserve the artistic intent of the content creator at the rendering stage, it is desired to control such processing.

Such processing can be controlled by the content creator by generating post-processing information/metadata associated to the pictures of the video. In the following the word "information" may be used instead of "metadata". For that, the video production module 100 comprises a metadata generation module 101 which outputs such post-processing metadata (MD) in accordance with the content creators input on an interface of the video production module.

Figure 7:
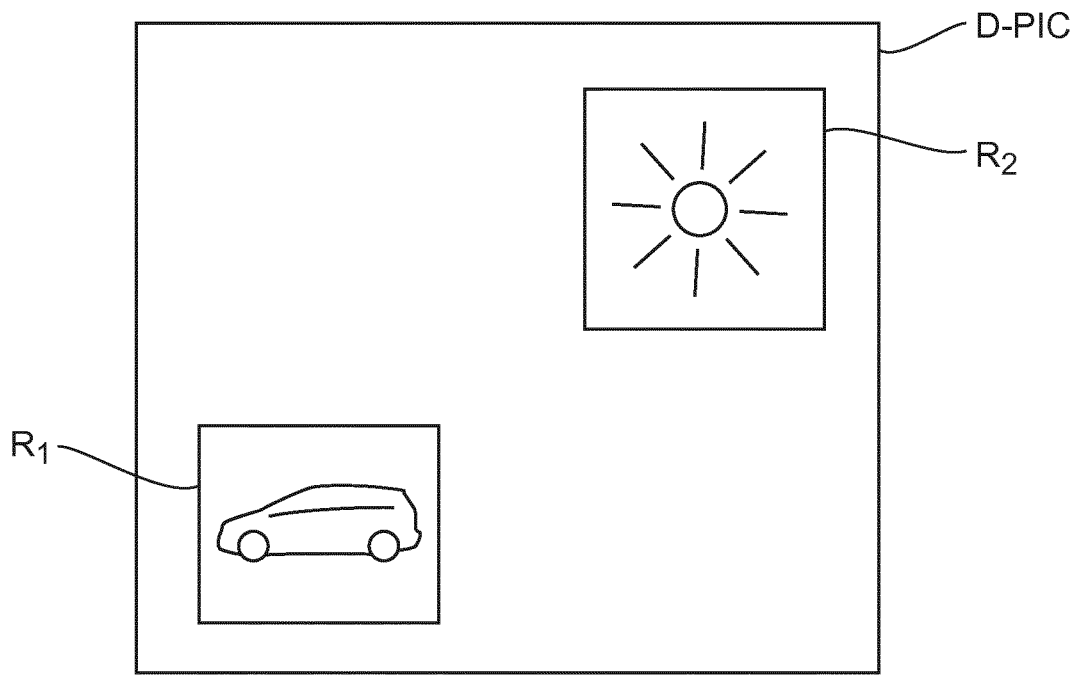
FIG. 7 illustrates exemplary processing windows defined in a picture in which post-processing should be applied.

As an example, FIG. 7 shows a picture wherein a colorist has defined two regions R1 and R2 for which post-processing should be applied. For example, the colorist first defines processing (or color-grading) parameters P1 to be applied to region R1 in order to emphasize the user's perception of the region R1. Then, the colorist defines processing parameters P2 to be applied to region R2 in order to prevent the user from keeping his attention to region R2. On this figure, the regions are rectangular. However, the present principles also apply to non-rectangular regions such as ellipse, circle, or any other parametric shapes.

Color-grading a picture (or a video) is a process of altering/enhancing the colors of the picture (or the video). Usually, color-grading a picture involves a change of the color volume (color space and/or dynamic range) or a change of the color gamut relative to this picture. Thus, two different color graded versions of a same picture are versions of this picture whose values are represented in different color volumes (or color gamut) or versions of the picture whose at least one of their colors has been altered/enhanced according to different color grades. This may involve user interactions from a colorist for example. The colorist performs a control on the color values of a first color-graded version of the captured picture by fine-tuning/tweaking some color values in order to instill an artistic intent with possibly local changes (to adjust for local signal characteristics).

The control parameters defined by the colorist are then represented by the set of parameters P1 for region R1 and P2 for region R2. Such sets of parameters P1 and P2 defines post-processing metadata to apply before rendering. According to an embodiment, the post-processing metadata apply on at least one region of a picture of the video content. The set of parameters MD thus comprises coordinates enabling to locate the region (R1, R2) in the picture and parameters (P1, P2) defining the post-processing steps to apply to the region.

Back to FIG. 1, the video production module 100 delivers a video content in the form of a sequence of pictures (PIC) and the set of metadata (MD) as inputs to a video encoder 102.

Such a video encoder 102 performs the encoding of the pictures PIC of the video into a bitstream and the encoding of the set of metadata MD into said bitstream according to an embodiment of the present principle. The video encoder 102 performs the encoding of the pictures PIC according to any video coding standards such as H.266, HEVC/H.265, AVC/H.264 or any proprietary video coding system.

Figure 2A:
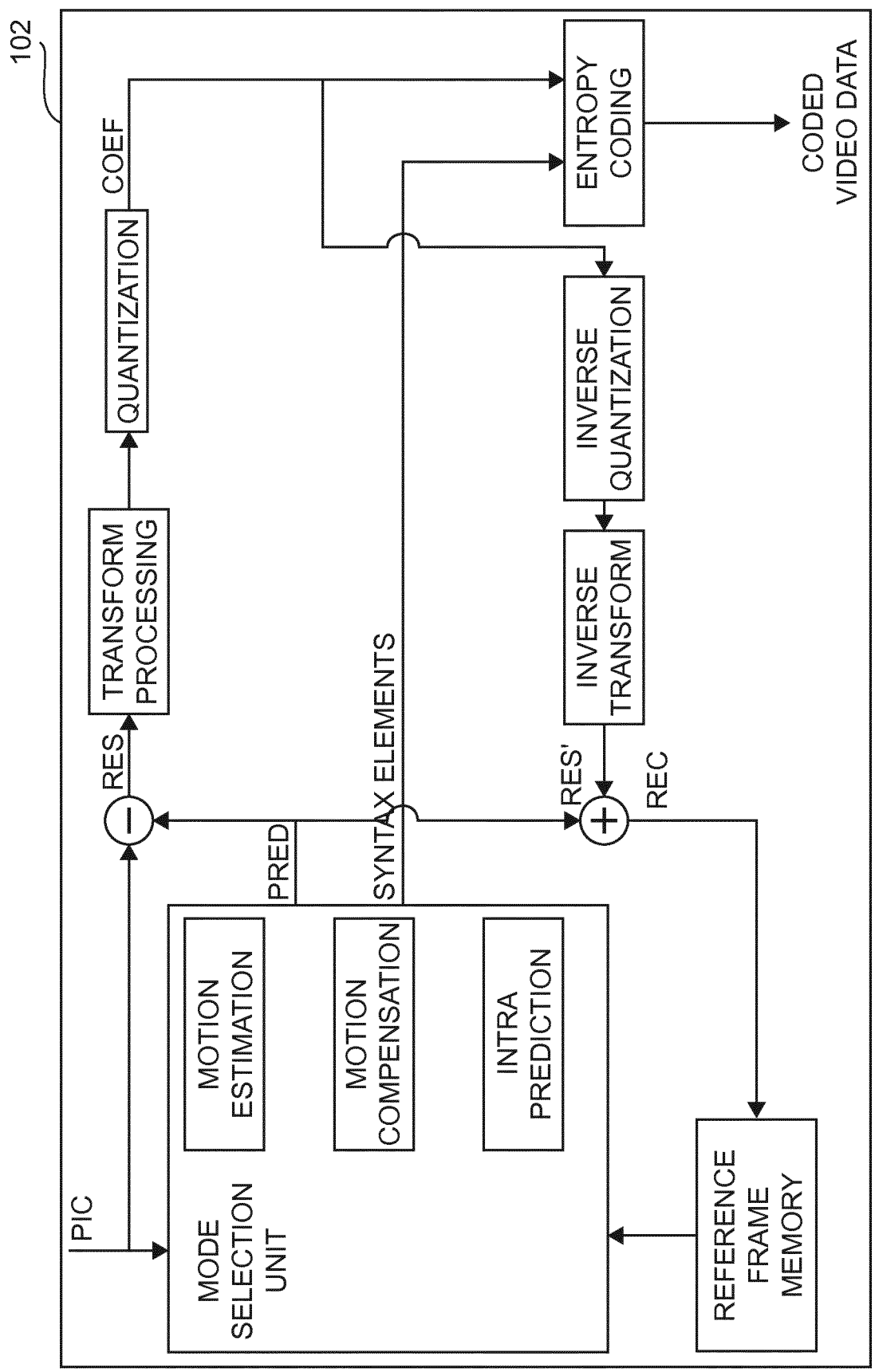

Classically, the video encoder 102 may include several modules for block-based video encoding, as illustrated in FIG. 2A. A picture PIC to be encoded is input to the encoder 102. The encoder 102 comprises a mode selection unit for selecting a coding mode for a block of a picture to be coded, e.g. based on a rate/distorsion optimization, such a mode selection unit comprising:
- a motion estimation module for estimating motion between one current block of the picture to be coded and reference pictures,
- a motion compensation module for predicting the current block using the estimated motion,
- an intra prediction module for spatially predicting the current block.

The mode selection unit delivers prediction blocks PRED and the corresponding syntax elements to be coded in the bitstream for performing the same block prediction at the decoder.

Residual blocks RES are then obtained from the blocks of the picture to be coded and the prediction blocks PRED. The residual blocks RES are transformed by a transform processing module and quantized by a quantization module delivering quantized residual transform coefficients COEF.

The syntax elements and quantized residual transform coefficients COEF are then inputted to an entropy coding module to deliver coded video data.

The quantized residual transform coefficients COEF are processed by an inverse quantization module and inverse transform module for reconstructing residual blocks RES'. Prediction blocks PRED are added to the reconstructed residual blocks RES' for reconstructing blocks forming a reconstructed current picture REC. The reconstructed current picture REC is then added to a reference frame memory for later use as a reference picture for encoding the following pictures of the video content.

Back to FIG. 1, according to an embodiment, the encoder 102 also comprises a stream generation module 108 adapted to deliver an encoded bitstream STR comprising the coded video data and the set of metadatas MD.

In order to map the coded video data to transport layers, most of video coding standards use the Network Abstraction Layer Unit (NALU) principle. According to this principle, the coded video data is organized into a sequence of data units referred to as NAL units, which are formed into access units.

Figure 2B:
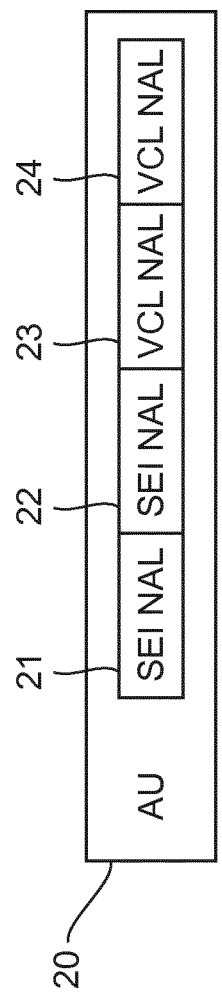

As illustrated in FIG. 2B, an access unit AU comprises a set of one or more NAL units that collectively represent pictures that correspond to the same output time. The one or more NAL units in an access unit comprise a set of one or more video coding layer (VCL) NAL units (23, 24) that collectively compose the pictures that correspond to the same output time, and zero or more non VCL NAL units (i.e. NAL units that are not VCL NAL units).

VCL NAL units carry slice segments of coded video data. Non-VCL NAL units typically contain control information.

One type of non-VCL NAL unit that may be present in an access unit is a Supplemental Enhancement Information (SEI) NAL unit, which contains supplemental data that may enhance usability of, but is not generally necessary for, a decoded video signal. SEI messages may contain various types of metadata associated with the coded video data that may provide information associated with, for example, picture output timing, displaying, interpretation of color space, and/or frame packing.

Back to FIG. 1, the stream generation module 108 organizes for one picture of the video content, the coded video data corresponding to the picture PIC into VCL NAL units of an access units and encodes the set of metadata MD into an SEI NAL unit, called herebelow processing window nesting SEI message.

In one embodiment of the present disclosure, such a processing window nesting SEI message has the following structure as illustrated by Table 1, in which the semantics of the syntax elements is given as follows:

TABLE 1

|  | Descriptor |
| --- | --- |
| processing_window_nesting( payloadSize ) { |  |
|   pw_id | ue(v) |
|   pw_rect_left_offset | se(v) |
|   pw_rect_right_offset | se(v) |
|   pw_rect_top_offset | se(v) |
|   pw_rect_bottom_offset | se(v) |
|   while( !byte_aligned( ) ) |  |
|     pw_nesting_zero_bit /* equal to 0 */ | u(1) |
|   sei_message( ) |  |
| } |  | pw_id contains an identifying number that may be used to identify the purpose of the one or more processing window. The value of pw_id shall be in the range of 0 to 232-2, inclusive.

Values of pw_id from 0 to 255 and from 512 to 231-1 may be used as determined by the application. Values of pw_id from 256 to 511 and from 231 to 232-2 are reserved for future use by ITU-T|ISO/IEC. Decoders encountering a value of pw_id in the range of 256 to 511, inclusive, or in the range of 231 to 232-2, inclusive, shall ignore it. pw_rect_left_offset, pw_right_offset, pw_rect_top_offset, and pw_rect_bottom_offset, specify the samples of the pictures in the metadata set, in terms of a rectangular region specified in picture coordinates. When not present, the values of pw_rect_left_offset, pw_rect_right_offset, pw_rect_top_offset, and pw_rect_bottom_offset are inferred to be equal to 0.

The processing window is specified for 4:4:4 chroma format. It contains the colour samples, i.e. pixels, with horizontal picture coordinates from pw_rect_left_offset to pic_width_in_luma_samples—(pw_rect_right_offset+1), and vertical picture coordinates from pw_rect_top_offset to pic_height_in_luma_samples—(pw_rect_bottom_offset+1), inclusive, where pic_with_in_luma_samples corresponds to the number of pixels of the luminance component of the picture according to the horizontal axis, and pic_height_in_luma_samples corresponds to the number of pixels of the luminance component of the picture according to the vertical axis.

The value of (pw_rect_left_offset+pw_rect_right_offset) shall be less than pic_width_in_luma_samples, and the value of (pw_rect_top_offset+pw_rect_bottom_offset) shall be less than pic_height_in_luma_samples.

pw_nesting_zero_bit shall be equal to 0.

In the case where the region is not rectangular, then the parameters enabling to locate the region in the picture may be different from pw_rect_left_offset, pw_right_offset, pw_rect_top_offset, and pw_rect_bottom_offset. As an example, for a circle, the position of its center and its radius are parameters making it possible to locate it within a picture.

The syntax structure "sei_message( ) corresponds to an SEI message containing enhancement information, i.e. the post-processing parameters to be applied to the pixels comprised in the rectangular region defined by the picture coordinates given in Table 1. According to the embodiment illustrated by Table 1, only one SEI message is to be applied to the region defined in the processing window nesting SEI message. The SEI message to be applied to the region is the message nested into the processing window nesting SEI message.

According to other embodiments, the processing window nesting message may comprise a parameter indicating a number of regions in the current picture to which an SEI message applies and/or a parameter indicating a number of SEI message to be applied to a region.

Another embodiment of a structure of a processing window nesting SEI message is illustrated in Table 2. In table 2, the relationship between a window and a specific SEI message, more precisely the association of a region with a speicifc SEI message, may be indicated in the semantics or at the application level. The association of "sei_message( )" with regions may also be specified with an additional association table.

TABLE 2

|  | Descriptor |
|---|---|
| processing_window_nesting( payloadSize ) { |  |
|   pw_id | ue(v) |
|   pw_rect_cnt_minus1 | ue(v) |
|   for( i = 0; i <= pw_rect_cnt_minus1; i++ ) { |  |
|     pw_rect_left_offset[i] | se(v) |
|     pw_rect_right_offset[i] | se(v) |
|     pw_rect_top_offset[i] | se(v) |
|     pw_rect_bottom_offset[i] | se(v) |
|   } |  |
|   while( !byte_aligned( ) ) |  |
|     pw_nesting_zero_bit /* equal to 0 */ | u(1) |
|   pw_sei_cnt_minus1 | ue(v) |
|   for( i = 0; i <= pw_sei_cnt_minus1; i++ ) |  |
|     sei_message( ) |  |
| } |  |

Additional semantics (over previous embodiment) is as follows:

pw_rect_cnt_minus1 plus 1 specifies the number of processing window (i.e. region) in the i-th nested sei_message ( ). The value of pw_rect_cnt_minus1 shall be in the range of 0 to 15, inclusive.

pw_rect_left_offset[i], pw_right_offset[i], pw_rect_top_offset[i], and pw_rect_bottom_offset[i], specify the samples of the pictures in the i-th metadata set, in terms of a rectangular region specified in picture coordinates. When not present, the values of pw_rect_left_offset[i], pw_rect_right_offset[i], pw_rect_top_offset[i], and pw_rect_bottom_offset[i] are inferred to be equal to 0.

The processing window is specified for 4:4:4 chroma format. It contains the colour samples with horizontal picture coordinates from pw_rect_left_offset[i] to pic_width_in_luma_samples—(pw_rect_right_offset[i]+1) and vertical picture coordinates from pw_rect_top_offset[i] to pic_height_in_luma_samples—(pw_rect_bottom_offset[i]+1), inclusive. The value of (pw_rect_left_offset[i] +pw_rect_right_offset[i]) shall be less than pic_width_in_luma_samples, and the value of (pw_rect_top_offset[i]+pw_rect_bottom_offset[i]) shall be less than pic_height_in_luma_samples. pw_sei_cnt_minus1 plus 1 specifies the number of SEI message structures comprised in the processing window nesting message.

It is noted that sei_message( ) may be constrained to be the same (i.e. same payloadType) if called within an iterative loop.

Another embodiment of a structure of a processing window nesting SEI message is illustrated in Table 3A or 3B. In Table 3A, a SEI message (sei_message( )) is defined per region while in table 3B a single SEI message is defined that apply to all the regions defined.

TABLE 3A

|  | Descriptor |
|---|---|
| processing_window_nesting( payloadSize ) { |  |
|   pw_id | ue(v) |
|   pw_sei_cnt_minus1 | ue(v) |
|   for( i = 0; i <= pw_sei_cnt_minus1; i++ ) { |  |
|     pw_rect_left_offset[i] | se(v) |
|     pw_rect_right_offset[i] | se(v) |
|     pw_rect_top_offset[i] | se(v) |
|     pw_rect_bottom_offset[i] | se(v) |
|     while( !byte_aligned( ) ) |  |
|       pw_nesting_zero_bit /* equal to 0 */ | u(1) |
|     sei_message( ) |  |
|   } |  |
| } |  |

TABLE 3B

|  | Descriptor |
|---|---|
| processing_window_nesting( payloadSize ) { |  |
|   pw_id | ue(v) |
|   pw_sei_cnt_minus1 | ue(v) |
|   for( i = 0; i <= pw_sei_cnt_minus1; i++ ) { |  |
|     pw_rect_left_offset[i] | se(v) |
|     pw_rect_right_offset[i] | se(v) |
|     pw_rect_top_offset[i] | se(v) |
|     pw_rect_bottom_offset[i] | se(v) |
|     while( !byte_aligned( ) ) |  |
|       pw_nesting_zero_bit /* equal to 0 */ } | u(1) |
|   sei_message( ) |  |
| } |  |

Semantics for this current embodiment is the same as the previous embodiments described above.

The stream generation module 108 encodes the set of metadata MD by encoding all the syntax elements according to any one of the embodiments described here above in Table 1-3. The syntax elements may be encoded by an entropy coder, as the entropy coder from FIG. 2A for instance.

The stream generation module 108 from FIG. 1 may operate when all or a certain number of the pictures PIC of the video content (corresponding to a Group Of Picture, i.e. a GOP) have been encoded by the encoder 102 or after the encoding of each picture, for example for live content. The stream generation module 108 then delivers an encoded bitstream STR to a transmitter 103 for transmitting such a bitstream.

The transmitter 103 receives the encoded bitstream STR and transmits the encoded bitstream in one or more output signals SIG. Typical transmitters perform functions such as, for example, one or more of providing error-correction coding, interleaving the data in the signal, randomizing the energy in the signal, and modulating the signal onto one or more carriers using a modulator (not shown). The transmitter 103 may include, or interface with, an antenna (not shown). Further, implementations of the transmitter 103 may be limited to a modulator. The transmitter 103 may transmit the output signal over a variety of media, such as satellite, cable, telephone-line, or terrestrial boradcast. The output signal may be transmitted over the Internet or some other network. The system shown in FIG. 1 may also be communicatively coupled with a storage unit (not shown). In one implementation, the storage unit is coupled with the encoder 102, and stores the encoded bitstream from the encoder 102. In another embodiment, the storage unit is coupled with the transmitter 103, and stores a bitstream from the transmitter 103. The storage unit may, in different implementations, one or more of a standard DVD, a Blu-Ray disc, a hard drive, or some other storage device.

The one or more signal SIG are then received by a decoding system 109. Such a decoding system 109 may be for example, a cell-phone, a computer, a set-top box, a television, an optical disc player, or other apparatus that receives encoded video and provides, for example, decoded video signal for display (display to a user, for example), for processing, or for storage.

The decoding system 109 is capable of receiving and processing data information. The receiving system or apparatus 109 includes a receiver 104 for receiving an encoded signal SIG.

The receiver 104 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator (not shown), de-randomizing the energy in the signal, de-interleaving the data in the signal, and error-correction decoding the signal. The receiver 104 may include, or interface with, an antenna (not shown). Implementations of the receiver 104 may be limited to a demodulator.

The receiver 104 then delivers an encoded bitstream STR to a video decoder 105. The video decoder 105 comprises a stream parser (not shown) adapted to parse the bitstream STR to extract an access unit AU corresponding to a picture to decode. The stream parser is also adapted to extract from the AU the coded video data from the VLC NAL units of the access unit and the SEI NAL units. The stream parser extracts for instance a processing window nesting SEI message from an SEI NAL unit. The syntax elements of the processing window nesting SEI message are decoded according to the syntax used during the coding stage. For instance, the syntax elements are decoded by the entropy decoder from FIG. 2C. The decoding of the processing window nesting SEI message makes it possible to obtain the set of post-processing metadata MD.

The decoding of the processing windows SEI message may be performed by the stream parser itself or by the post-processor adapted to apply the post-processing steps defined in the message. The set of metadata MD comprises coordinates (left offset, right offset, top offset and bottom offset) enabling to locate the region in the picture to which post-processing applies and parameters defining the post-processing steps to apply to the region. The set of metadata MD may comprise several regions to which a same post-processing applies and/or several regions to which different post-processing apply.

The coded video data is then passed to the video decoding modules of the video decoder 105. The video decoder 105 may comprise video decoding modules such as illustrated by FIG. 2C.

Figure 2C:
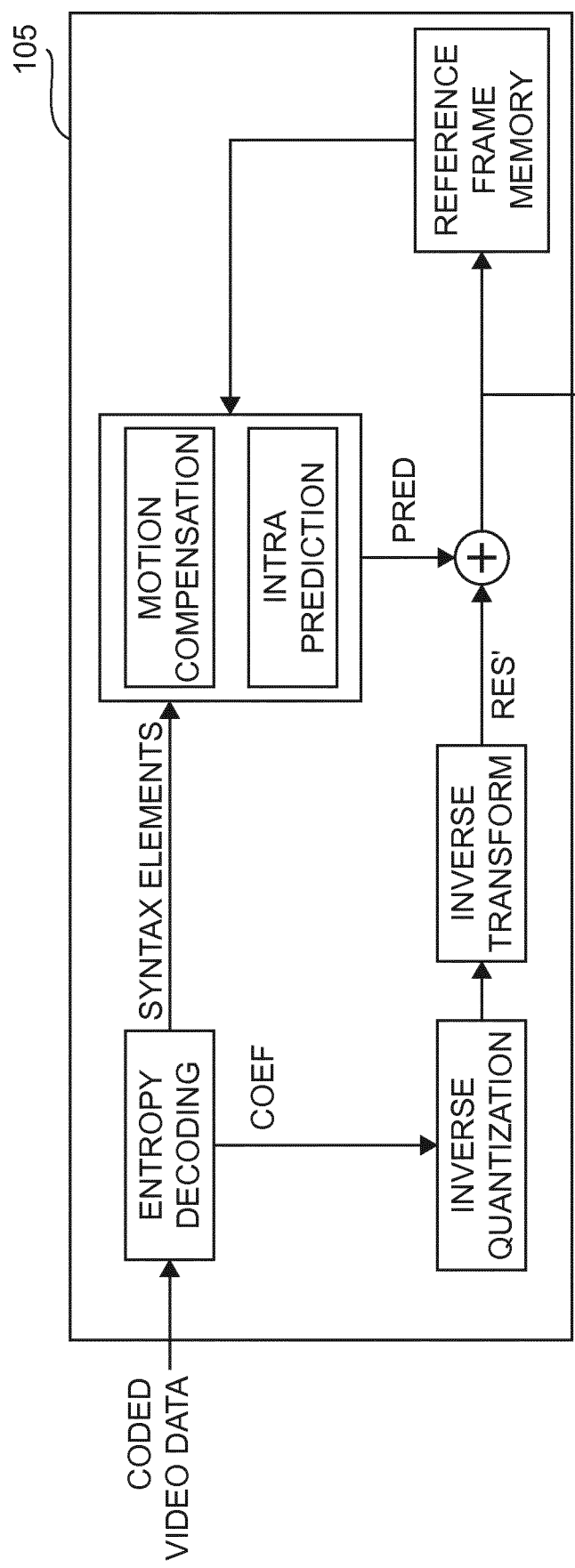

As illustrated in FIG. 2C, video coded data is passed to an entropy decoding module that performs entropy decoding and delivers quantized coefficients COEF to an inverse quantization module and syntax elements to a prediction module.

The quantized coefficients COEF are inverse quantized by the inverse quantization module and inverse transformed by an inverse transform module delivering residual blocks data RES'. The prediction module builds prediction blocks PRED according to the syntax element and using a motion compensation module if a current block has been inter-predicted or an intra prediction module if the current block has been spatially predicted. A reconstructed picture D_PIC is obtained by adding prediction blocks PRED and residual blocks RES'. The reconstructed picture D_PIC is added to a reference frame memory for later use as reference frame.

The recontructed picture D_PIC is then outputted by the video decoder 105.

Back to FIG. 1, the reconstructed picture D_PIC, output by the video decoder 105 is input to a post-processor 106 with the set of metadatas MD. In some embodiments, the decoder apparatus 105 may be comprised in a set top box.

The post-processor 106 applies the post-processing parameters defined in the set of metadata MD to the region defined by the coordinates indicated in the set of metadata MD. As an example, FIG. 7 illustrates two regions R1 and R2 of a reconstructed picture D_PIC to which post-processing P1, and P2 should be applied respectively. For example, a first set of parameters P1 defining color-grading or processing operation for region R1 has been coded in an SEI message nested in the processing window SEI message and a second set of parameters P2 defining another color-grading or processing operation for region R2 has been coded in another SEI message nested in the processing window SEI message. Such an example may be encoded into one processing window nesting SEI message using the syntax as illustrated by table 2 or 3, or into two separate processing window nesting SEI message using the syntax as illustrated by table 1.

In the example of FIG. 7, the post-processor 106 applies the post-processing parameters P1 to the pixels of the picture D_PIC comprised in region R1, and the post-processing parameters P2 to the pixels of D_PIC comprised in region R2.

The post-processor 106 then outputs a processed picture P-PIC to a renderer 107.

In some embodiments, the post-processor 106 may be comprised in the renderer 107, or in the decoder apparatus 105.

Thus, the renderer 107 may be, for example, a screen of a television, a computer monitor, a computer (for storage, processing, or display), or some other storage, processing, or display apparatus.

The renderer 107 may be embedded in a same apparatus as the decoder 105 and post-processor 106.

One embodiment of the present disclosure relates to a method for coding a video. FIG. 3 illustrates block diagram of such a method for coding a video according to one embodiment of the disclosure.

Video coding method starts at step 300. At step 301, a picture of the video is encoded into a bitstream. For instance, an encoding apparatus for coding a picture as described in reference to FIG. 2A may be used. At step 302, at least one Supplemental Enhancement Information nesting message is encoded. Such an SEI nesting message is also called a processing window SEI message in the present disclosure. Step 302 comprises a sub-step 303 of encoding at least one set of parameters representative of a location of a region in said picture. For instance, such a set of parameters may be the coordinates of the region R1 from FIG. 7, defined by a left offset from the left border of the picture, a right offset defined from the right border of the picture, a top offset defined from the top borde of the picture and a bottom offset defined from the bottom border of the picture. Such coordinates enable to define a rectangular region R1 in the picture. Therefore, pixels from region R1 may easily be located during post-processing. Step 302 also comprises a substep 304 of encoding at least one Supplemental Enhancement Information message (SEI). The payload of such an SEI message encodes processing metadata for processing pixels comprised in said region of the picture. The syntax and parameters to encode in such an SEI message depends on the type of processing to operate on the regions. An advantage of the present discosure is to enable the re-use of existing SEI message. Therefore, the syntax and coding of such SEI message is not described further here. Examples of such SEI messages are disclosed in standard definition such as AVC/H.264 or HEVC/ITU-T H.265 High Efficiency Video Coding. Such SEI messages are defined in Annex E of the document ITU-T H.265 of April 2015. The tone_mapping_info( ) of section D2.15, the post_filter_hint( ) of section D2.14 and colour_remapping_info( ) of section D2.32 are examples of such SEI messages that may be nested into the nesting SEI.

Steps 301 and 302 are performed for each picture of a video content that needs to be coded. Step 302 may be necessary only on some pictures of the video content, depending on whether metadata have been generated for one picture or not during the production stage.

Video coding method then ends at step 305.

According to another embodiment, step 302 further comprises a substep 306 (not shown) performing the encoding of a parameter indicating a number R of regions in said picture to which said at least one SEI message applies. In this embodiment, R regions in said picture needs to be post-processed and the coordinates of each of these R regions needs to be encoded.

Therefore, when such a number is greater than 1, substep 303 is iterated until the coordinates of each of the R regions have been encoded. Such an embodiment is illustrated in Table 2 or 3.

According to another embodiment, step 302 further comprises a substep 307 performing encoding a parameter indicating a number N of post-processing SEI messages. In this embodiment, N SEI messages, i.e N sets of post-processing parameters have to be encoded in the SEI nesting message. Therefore, when such a number is greater than 1, substep 304 is iterated until a number of SEI messages equal to N have been encoded. Such an embodiment is illustrated in Table 2.

One embodiment of the present disclosure relates to a method for decoding a video. FIG. 4 illustrates block diagram of such a method for decoding a video according to one embodiment of the disclosure.

Video decoding method starts at step 400. At step 401, a picture of the video is decoded from a bitstream, delivering a decoded picture. For instance, a decoding apparatus for decoding a picture as described in reference to FIG. 2C may be used. At step 402, at least one Supplemental Enhancement Information nesting message is decoded. Such an SEI nesting message is also called a processing window SEI message in the present disclosure. Step 402 comprises a sub-step 403 of decoding at least one set of parameters representative of a location of a region in said picture. For instance, such a set of parameters may be the coordinates of the region R1 from FIG. 7, defined by a left offset from the left border of the picture, a right offset defined from the right border of the picture, a top offset defined from the top border of the picture and a bottom offset defined from the bottom border of the picture. Such coordinates enable to define a rectangular region R1 in the picture. And thus, pixels from region R1 may easily be located during post-processing.

Step 402 also comprises a substep 404 of decoding at least one Supplemental Enhancement Information message (SEI). The payload of such an SEI message comprises processing metadata for processing pixels comprised in said region of the picture.

Steps 401 and 402 are performed for each picture of a video content that needs to be decoded. Step 402 may be necessary only when at least one SEI NAL Unit comprising an SEI nesting message of type processing window nesting message is present in the access unit corresponding to the current picture. If such SEI NAL unit is not present in the access unit, this means no metadata for region-based processing has been transmitted with the video coded data. Video decoding method then ends at step 405.

According to another embodiment, step 402 further comprises a substep 406 (not shown) performing decoding a parameter indicating a number R of regions in said picture to which said at least one SEI message applies. In this embodiment, R regions in said picture needs to be post-processed and the coordinates of each of these R regions needs to be decoded.

Therefore, when such a number is greater than 1, substep 403 is iterated until the coordinates of each of the R regions have been decoded. Such an embodiment is illustrated in Table 2 or 3.

According to another embodiment, step 402 further comprises a substep 407 performing decoding a parameter indicating a number N of SEI messages. In this embodiment, N SEI messages, i.e N set of post-processing parameters have to be decoded in the SEI nesting message. Therefore, when such a number is greater than 1, substep 404 is iterated until a number of SEI messages equal to N have been decoded. Such an embodiment is illustrated in Table 2.

Figure 5:
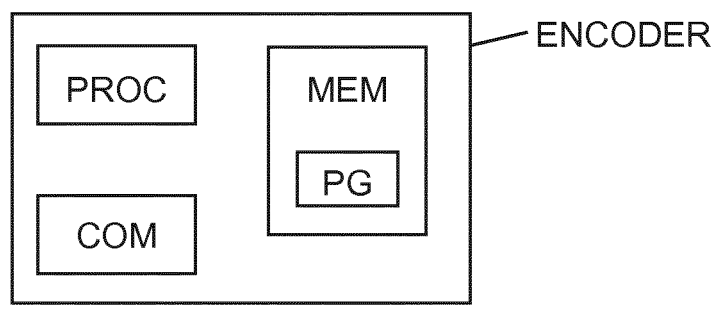
FIG. 5 illustrates an exemplary encoder that may be used in one embodiment.

FIG. 5 illustrates the simplified structure of an apparatus (ENCODER) for coding a video according to an embodiment. Such an apparatus for coding a video is configured to implement the method for coding a video according to the present principles which has been described here above in reference with FIG. 1 or 3. The encoder apparatus of FIG. 5 may be as an example the encoder 102 as described in FIG. 1.

In the example shown in FIG. 5, the encoder apparatus comprises a processing unit PROC equipped for example with a processor and driven by a computer program PG stored in a memory MEM and implementing the method for coding a video according to the present principles.

The encoder apparatus ENCODER is configured to:
encode at least one picture of said video into a bitstream,
encode at least one Supplemental Enhancement Information nesting message, wherein when encoding said at least one Supplemental Enhancement Information nesting message, the encoder is further configured to:
  encode at least one set of parameters representative of a location of a region in said picture,
  encode at least one Supplemental Enhancement Information message, wherein said at least one Supplemental Enhancement Information message encodes processing metadata for processing pixels comprised in said region of said picture.

At initialization, the code instructions of the computer program PG are for example loaded into a RAM (not shown) and then executed by the processor of the processing unit PROC. The processor of the processing unit PROC implements the steps of the method for coding a video which has been described here above, according to the instructions of the computer program PG.

Optionally, the encoder apparatus ENCODER comprises a communications unit COM to transmit an encoded bitstream to a decoder.

The encoder apparatus ENCODER also comprises an interface for receiving a picture to be coded, a set of parameters representative of a location of a region in said picture and processing metadata to encode.

Figure 6:
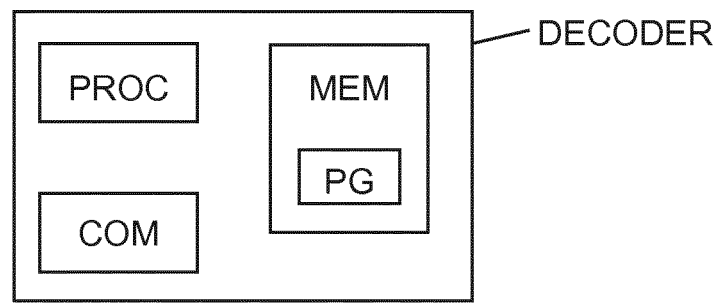
FIG. 6 illustrates an exemplary decoder that may be used in one embodiment.

FIG. 6 illustate the simplified structure of an apparatus (DECODER) for decoding a video according to an embodiment. Such an apparatus for decoding a video is configured to implement the method for decoding a video according to the present principles which has been described here above in reference to FIG. 1 or 4. The decoder apparatus of FIG. 6 may be as an exemple the decoder 105 as described in FIG. 1.

In the example shown in FIG. 5, the decoder apparatus comprises a processing unit PROC equipped for example with a processor and driven by a computer program PG stored in a memory MEM and implementing the method for decoding a video according to the present principles.

The decoder apparatus DECODER is configured to:
decode at least one picture of said video from said bitstream, delivering a decoded picture,
decode at least one Supplemental Enhancement Information nesting message, wherein when decoding said at least one Supplemental Enhancement Information nesting message, the decoder is further configured to:
decode at least one set of parameters representative of a location of a region in said decoded picture,
decode at least one Supplemental Enhancement Information message, wherein said at least one Supplemental Enhancement Information message comprises processing metadata for processing pixels comprised in said region of said decoded picture.

At initialization, the code instructions of the computer program PG are for example loaded into a RAM (not shown) and then executed by the processor of the processing unit PROC. The processor of the processing unit PROC implements the steps of the method for decoding a video which has been described here above, according to the instructions of the computer program PG.

Optionnally, the decoder apparatus DECODER comprises a communications unit COM to receive an encoded bitstream from an encoder.

The decoder apparatus DECODER also comprises an interface adapted for communicating with a post-processor so as to transmit a decoded picture, a decoded set of parameters representative of a location of a region in said decoded picture and decoded processing metadatas to apply to pixels of said region in said decoded picture.

The invention claimed is:

1. A method for encoding a video comprising:
encoding a picture of the video into a bitstream, the picture comprising at least two regions;
encoding a Supplemental Enhancement Information nesting message, wherein encoding the Supplemental Enhancement Information nesting message comprises:
encoding a parameter indicating a number of regions in the picture;
encoding, for each of the regions, at least one parameter representative of a location of the region in the picture;
encoding a parameter indicating a number of Supplemental Enhancement Information messages nested in the Supplemental Enhancement Information nesting message;
encoding, for each Supplemental Enhancement Information message nested in the Supplemental Enhancement Information nesting message, post-processing region-based information;
encoding information representative of an association of at least one region with at least one Supplemental Enhancement Information message nested in the at least one Supplemental Enhancement Information nesting message.

2. The method of claim 1, wherein information representative of an association of at least one region with at least one Supplemental Enhancement Information message nested in the at least one Supplemental Enhancement Information nesting message is an association table.

3. The method of claim 1, wherein encoding the Supplemental Enhancement Information nesting message further comprises encoding a parameter indicating a number of regions in the picture to which a Supplemental Enhancement Information message applies.

4. The method of claim 1, wherein a single Supplemental Enhancement Information message applies to all regions in the picture.

5. The method of claim 1, wherein encoding the Supplemental Enhancement Information nesting message further comprises encoding at least one parameter describing at least one post processing operation to apply to at least one region associated with at least one Supplemental Enhancement Information message.

6. A method for decoding a bitstream representative of a coded video comprising:
decoding a picture of the video from the bitstream, the picture comprising at least two regions;
decoding a Supplemental Enhancement Information nesting message, wherein decoding the Supplemental Enhancement Information nesting message comprises:
decoding a parameter indicating a number of regions in the picture;
decoding, for each of the regions, at least one parameter representative of a location of the region in the picture;
decoding a parameter indicating a number of Supplemental Enhancement Information messages nested in the Supplemental Enhancement Information nesting message;
decoding, for each Supplemental Enhancement Information message nested in the Supplemental Enhancement Information nesting message, post-processing region-based information;
decoding information representative of an association of at least one region with at least one Supplemental Enhancement Information message nested in the at least one Supplemental Enhancement Information nesting message.

7. The method of claim 6, wherein information representative of an association of at least one region with at least one Supplemental Enhancement Information message nested in the at least one Supplemental Enhancement Information nesting message is an association table.

8. The method of claim 6, wherein decoding the Supplemental Enhancement Information nesting message further comprises decoding a parameter indicating a number of regions in the picture to which a Supplemental Enhancement Information message applies.

9. The method of claim 6, wherein a single Supplemental Enhancement Information message applies to all regions in the picture.

10. The method of claim 6, wherein decoding the Supplemental Enhancement Information nesting message further comprises decoding at least one parameter describing at least one post processing operation to apply to at least one region associated with at least one Supplemental Enhancement Information message.

11. An apparatus for encoding a video, the apparatus comprising at least one processor and at least one memory having stored instructions operative, when executed by the at least one processor, to cause the apparatus to:
   encode a picture of the video into a bitstream, the picture comprising at least two regions;
   encode a Supplemental Enhancement Information nesting message, wherein encoding the Supplemental Enhancement Information nesting message comprises:
   encoding a parameter indicating a number of regions in the picture;
   encoding, for each of the regions, at least one parameter representative of a location of the region in the picture;
   encoding a parameter indicating a number of Supplemental Enhancement Information messages nested in the Supplemental Enhancement Information nesting message;
   encoding, for each Supplemental Enhancement Information message nested in the Supplemental Enhancement Information nesting message, post-processing region-based information;
   encoding information representative of an association of at least one region with at least one Supplemental Enhancement Information message nested in the at least one Supplemental Enhancement Information nesting message.

12. The apparatus of claim 11, wherein information representative of an association of at least one region with at least one Supplemental Enhancement Information message nested in the at least one Supplemental Enhancement Information nesting message is an association table.

13. The apparatus of claim 11, wherein to encode the Supplemental Enhancement Information nesting message comprises encoding a parameter indicating a number of regions in the picture to which a Supplemental Enhancement Information message applies.

14. The apparatus of claim 11, wherein a single Supplemental Enhancement Information message applies to all regions in the picture.

15. An apparatus for decoding a bitstream representative of a coded video, the apparatus comprising at least one processor and at least one memory having stored instructions operative, when executed by the at least one processor, to cause the apparatus to:
   decode a picture of the video from the bitstream, the picture comprising at least two regions;
   decode a Supplemental Enhancement Information nesting message, wherein
      decoding the Supplemental Enhancement Information nesting message comprises:
      decoding a parameter indicating a number of regions in the picture;
      decoding, for each of the regions, at least one parameter representative of a location of the region in the picture,
      decoding a parameter indicating a number of Supplemental Enhancement Information messages nested in the Supplemental Enhancement Information nesting message;
      decoding, for each Supplemental Enhancement Information message nested in the Supplemental Enhancement Information nesting message, post-processing region-based information;
      decoding information representative of an association of at least one region with at least one Supplemental Enhancement Information message nested in the at least one Supplemental Enhancement Information nesting message.

16. The apparatus of claim 15, wherein information representative of an association of at least one region with at least one Supplemental Enhancement Information message nested in the at least one Supplemental Enhancement Information nesting message is an association table.

17. The apparatus of claim 15, wherein to decode the Supplemental Enhancement Information nesting message comprises decoding a parameter indicating a number of regions in the picture to which a Supplemental Enhancement Information message applies.

18. The apparatus of claim 15, wherein a single Supplemental Enhancement Information message applies to all regions in the picture.

19. A non-transitory computer readable storage medium having stored instructions that are operative, when executed by a processor, to cause the processor to perform:
   encoding a picture of a video into a bitstream, the picture comprising at least two regions;
   encoding Supplemental Enhancement Information nesting message, wherein encoding the Supplemental Enhancement Information nesting message comprises:
   encoding a parameter indicating a number of regions in the picture;
   encoding, for each of the regions, at least one parameter representative of a location of the region in the picture;
   encoding a parameter indicating a number of Supplemental Enhancement Information messages nested in the Supplemental Enhancement Information nesting message;
   encoding, for each Supplemental Enhancement Information message nested in the Supplemental Enhancement Information nesting message, post-processing region-based information;
   encoding information representative of an association of at least one region with at least one Supplemental Enhancement Information message nested in the at least one Supplemental Enhancement Information nesting message.

20. The computer readable storage medium of claim 19, wherein information representative of an association of at least one region with at least one Supplemental Enhancement Information message nested in the at least one Supplemental Enhancement Information nesting message is an association table.

* * * * *

UNITED STATES PATENT AND TRADEMARK OFFICE
CERTIFICATE OF CORRECTION

| | |
|---|---|
| PATENT NO. | : 10,986,350 B2 |
| APPLICATION NO. | : 16/090263 |
| DATED | : April 20, 2021 |
| INVENTOR(S) | : Andrivon |

It is certified that error appears in the above-identified patent and that said Letters Patent is hereby corrected as shown below:

On the Title Page

Item [30], replace "1630538" with --16305383.8--.

In the Specification

Column 1, Line 37: replace "metada" with --metadata--.

Column 2, Line 63: replace "bandwith" with --bandwidth--.

Column 4, Lines 9-10: replace "dislosed" with --disclosed--.

Column 6, Line 24: replace "creators" with --creator's--.

Column 7, Line 11: replace "rate/distorsion" with --rate/distortion--.

Column 9, Line 4: replace "structure "sei_message( )" with --structure "sei_message( )"--.
Column 9, Line 23: replace "speicifc" with --specific--.

Column 11, Line 4: replace "boradcast" with --broadcast--.

Column 12, Line 17: replace "recontructed" with --reconstructed--.

Column 13, Line 6: replace "borde" with --border--.
Column 13, Line 17: replace "discosure" with --disclosure--.
Column 13, Line 48: replace "i.e." with --i.e.,--.

Column 14, Line 37: replace "i.e." with --i.e.,--.

Signed and Sealed this
Tenth Day of May, 2022

*Katherine Kelly Vidal*
Katherine Kelly Vidal
*Director of the United States Patent and Trademark Office*

Column 15, Line 15: replace "illustate" with --illustrates--.
Column 15, Line 21: replace "as an exemple" with --an example of--.
Column 15, Line 49: replace "Optionnally" with --Optionally--.